United States Patent [19]

Hock

[11] 4,222,633

[45] Sep. 16, 1980

[54] OPTICAL ARRANGEMENT FOR GEOMETRICALLY SEPARATING THE LIGHT FLUXES IN IMAGING SYSTEMS

[75] Inventor: Fromund Hock, Morgenweide 32, 633 Wetzlar, Fed. Rep. of Germany

[73] Assignee: Fromund Hock, Hanover, Fed. Rep. of Germany

[21] Appl. No.: 915,320

[22] Filed: Jun. 14, 1978

Related U.S. Application Data

[63] Continuation of Ser. No. 801,777, May 31, 1977, abandoned, which is a continuation of Ser. No. 625,890, Oct. 28, 1975, abandoned.

[30] Foreign Application Priority Data

Oct. 31, 1974 [DE] Fed. Rep. of Germany ....... 2451668

[51] Int. Cl.³ .............................................. G02B 5/18
[52] U.S. Cl. .................................. 350/162 R; 356/395
[58] Field of Search ........................ 350/3.70, 6.2, 6.5, 350/6.6, 8, 9, 27, 29, 31, 54, 55, 162 R, 162 SF, 359; 356/395, 396

[56] References Cited

U.S. PATENT DOCUMENTS

| | | | |
|---|---|---|---|
| 3,245,307 | 4/1966 | DeLang | 356/395 X |
| 3,482,107 | 12/1969 | Hock | 356/365 X |
| 3,508,834 | 4/1970 | Hock et al. | 356/395 X |
| 3,630,625 | 12/1971 | DeLang | 350/162 R X |
| 3,756,723 | 9/1973 | Hock | 356/351 X |

FOREIGN PATENT DOCUMENTS 1145807  3/1963 Fed. Rep. of Germany .

OTHER PUBLICATIONS

DeLang, et al., "Accurate Digital Measurement of Displacements by Optical Means", *Philips Tech. Review*, vol. 30, No. 6/7, 1969, pp. 149–160.

DeLang et al., "Genaue Digitale Messung Von Verschiebungen mit Optischen Mitteln", *Philips Technische Rundschau*, 1969/1970, pp. 153–164.

Hock, Papers #8A, 8B, *Conference on Moiré Fringe Technology*, Jun. 1972, Birniehill Institute, East Kilbride, Glasgow, Gr. Britain.

*Primary Examiner*—John K. Corbin
*Assistant Examiner*—John D. Lee
*Attorney, Agent, or Firm*—Gilbert L. Wells

[57] ABSTRACT

In a grating measuring system of a basic type originated by DeLang employing a concave mirror-lens main optical system introduced by Dyson, improved separation of the light fluxes of input illumination and output motion-modulated signals is achieved. The arrangement depends upon the fact that in such a system wherein the grating is imaged back on itself so that for every point in the half plane containing the grating surface at one side of the optical axis, there is a conjugate point in the half plane at the other side of the axis. Separation by reason of beam separation is attained by illuminating one half plane and deriving output signals from the other. Further separation is attained from the fact that the concave mirror lies in a so-called "complementary plane" or "Fourier plane" to the object-image plane. Each point in the complementary plane is the focus of all rays originating in the object-image plane in a particular direction. Thus for each of the finite directions corresponding to successive orders of diffraction from the grating, a virtual focus of all of the light in each of the orders is situated in the complementary plane in an array of parallel bright lines. The invention lies in the imaging of this array of output virtual sources on a sensor array by mean of common optics, whereby both space-frequency filtering and perfect registry are maintained, and in large-aperture auxilliary lenses to image both the grating plane and the Fourier plane away from the main imaging structure and the grating for better separation of beams.

5 Claims, 3 Drawing Figures

OPTICAL ARRANGEMENT FOR GEOMETRICALLY SEPARATING THE LIGHT FLUXES IN IMAGING SYSTEMS

This is a continuation of application Ser. No. 801,777 filed May 31, 1977 which in turn is a continuation of application Ser. No. 625,890 filed Oct. 28, 1975 both now abandoned.

BACKGROUND OF THE INVENTION

The invention relates to a lens arrangement for geometrically separating the light fluxes of imaging systems into light ray bundles of different positions and directions of extension. The arrangement includes an object imaging optical system defining at least two planes which are complementary to one another, preferably in infinity. Planes are complementary to each other if in a given area of one plane any point in this area is connected to each point of a given area in the other plane by geometrical rays.

Imaging systems which utilize emitted and returning light rays, e.g. concave mirror systems, and systems of which the image plane and the object plane are not accessible present difficulties with regard to their light paths when utilized in praxi. When light is introduced into such systems across the whole free diameter of the systems by means of partially light transmitting mirrors—as for example described in the German Pat. No. 1 145 807—and thereafter the emitted light rays are separated from the returning light rays by means of the same partially transmitting mirror difficulties are encountered which are caused by reflexes, scattered light, astigmatism of inclined parallel glass plates etc., which cause a deterioration of contrast and image quality. To a certain extent these difficulties may be overcome by geometrically separating the emitted from the returning light rays and allocating the separated light ray bundles to different portions of the object field or the image field which may be imaged one upon the other. This method is, for example, used with autocollimating telescopes.

In other imaging systems light rays which extend in the same direction but pass through different portions of the object field or image field respectively transmit the same portions of the Fourier plane in infinity related to such object field or image field. Thereby even more severe difficulties are caused if light ray bundles are to be separated which travel through the object field or image field respectively and extend in different directions because their light fluxes represent different parameters of the measurement and are, therefore, modulated with different frequencies, phases, and amplitudes.

Such systems are described, for example, in "Philips Technische Rundschau" (Philips Technical Survey), 1969/1970, page 153 etc. and page 158, and, further by the applicant in the Conference Report of the "Conference on Moiré Fringe Technology" held June 19/20, 1972 at Birnihill Institute, National Engineering Laboratory, East Kilbride Glasgow, Paper 8a, FIG. 25. These descriptions relate to position measuring systems for example in step repeaters measuring in one or two coordinates which by means of concave mirror lens systems are adapted to produce large flat object fields or image fields respectively having good chromatic correction. When phase gratings are imaged one upon another, which produces a high light efficiency and a good signal characteristic, a modulation of light fluxes is generated in such step repeaters by the movement of the grating and the grating image relative to one another which light fluxes are modulated with different phase relation according to the interference of different orders of diffraction. Consequently, the light rays of different areas of the solid angle of diffracted beams must be allocated to separated photoelectric receivers in order to obtain the desired signal components of rotating electrical fields.

However, this method has the disadvantage that the size of the illumination aperture causes the cross section of the used light bundles to be unsharp or fuzzy. In order to separate the light ray bundle which illuminates the object field clearly from the adjacent light ray bundle which illuminates the image field both light ray bundles must have a distance from one another which is determined by the illumination aperture. This is achieved by an inclined position of the light ray bundles relative to one another. This inclination, however, requires more space and renders the device rather voluminous. The unsharpness caused by object illumination aperture further causes a considerable loss of light efficiency in the whole system.

It is therefore an object of the present invention to provide an imaging arrangement by which the light flux may be separated both according to areas of the object field and of the image field and according to the direction of the light rays in these field areas when the imaging planes or the Fourier plane are directly inaccessible. And it is a further object to provide such an arrangement which requires less space and has an improved light transmission efficiency.

SUMMARY OF THE INVENTION

These objects are attained by combining with the above described object imaging system an auxiliary imaging system which defines at least two additional planes which are conjugated planes to the complementary planes of the object imaging system and by providing further optical means which separate one of said additional conjugated planes into at least two areas and thus separate geometrically the two light ray bundles travelling through said plane areas. Either of said two light ray bundles transmits optically and at least partially a plane which is complementary to the object/image plane of the object imaging system into one of said additional conjugated planes. To different areas of the latter at least one photoelectric receiver and at least one light source are allocated in such a manner that said different areas are defined by specific directions of light travel originating at the object/image plane. The latter conjugated plane is with regard to the location of the light source the input part of the optical system and with regard to the location of the photoelectric receiver the output part. The input- and output plane may be one plane or may be two separated planes.

Advantages in designing such arrangements are achieved when for the auxiliary imaging system at least certain elements are used which are already part of the original object imaging system.

As an optical means for subdividing the one conjugated plane into areas mirrors of different inclination may be used of which each one is disposed with at least one of its edges in the area of the plane which is conjugated to the object/image plane. Likewise lens portions may be used which are adjacent to one another but do not have coinciding optical axes. Also, adjacently arranged refracting optical wedges may be used which differ from one another in their orientation. Diaphragms may be disposed in the auxiliary imaging systems. The light sources and the photoelectric receivers are advantageously mounted adjustably. Preferably, pre-adjusted plug-in units are used for this purpose.

The meaning of the term "plane" in optical systems is as well flat as curved.

DESCRIPTION OF THE DRAWINGS

The invention will be more readily comprehended from the following description when taken in conjunction with the appending drawings, wherein.

DESCRIPTION OF THE PREFERRED EMBODIMENTS

Figure 1:
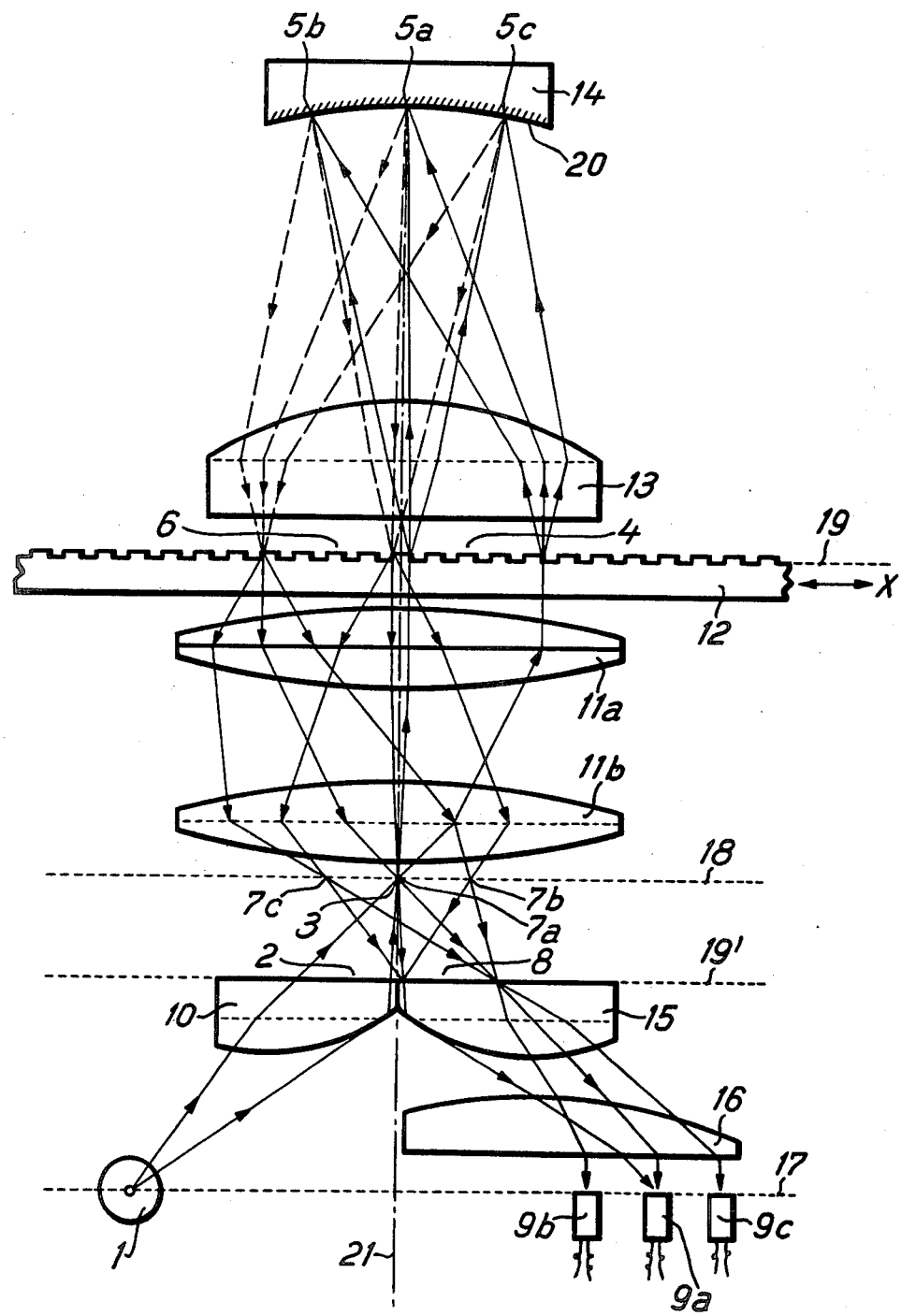
FIG. 1 shows schematically a linear movement and position change measuring system comprising a transmitted light grating length standard wherein the auxiliary imaging system is located separately from the object imaging system.

Referring now to the drawings, FIG. 1 shows an object imaging system having an axis 21 comprising a concave mirror 14 having a reflecting surface 20 and a lens 13 with collimator function. A system of this type accomplishes the imaging of relatively large flat fields with good chromatic correction. At an imaging ratio of 1:1 the object plane and the image plane coincide in one common plane 19. The object is represented by a grating scale 12 which is movable in the direction of the double-headed arrow.

In this system the coinciding object plane and image plane 19 also coincide with the ruling plane of the grating scale 12. To this ruling plane the reflecting mirror surface 20 is complementary in infinity.

The auxiliary imaging system comprises the lenses 11a and 11b. The lenses 10 and 15 are provided for subdividing one of the conjugated planes into plane areas according to the invention.

The plane which is conjugated to the object/image plane 19 is designated 19'; and the planes which are conjugated planes to the mirror surface 20 are designated 17 and 18. The lenses 15 and 16 are provided for imaging a light source 1 disposed in the plane 17 onto three photoelectric receivers 9a; 9b; 9c. The advantages of the new arrangement will become apparent from the following description:

By way of the lens 10, which functions as a condenser, the light source 1 is imaged in an inclined direction into the area of the optical axis 21 of the system in the plane 18. This produces a first image 3 of the light source 1. If deemed necessary the illumination aperture may be limited by inserting a suitable diaphragm in this plane.

Caused by the auxiliary imaging system 11a, 11b the illuminating light ray bundle is directed towards the scale ruling plane 19 (also object/image plane) as a parallel bundle of light rays. The portion 4 of the grating 12 which is to be illuminated may be defined by means of a semi-circular diaphragm disposed on the plane surface of the lens 10.

The illuminating light ray bundle passes, for example, through the laminar phase grating 19 in the zero and ±first order of diffraction. By these three light ray bundles the area 4 of the grating 12, with the details contained therein, is imaged on the adjacent area 6 of the ruling plane 19 of the grating. For each order of diffraction there is focused on the mirror reflecting surface 20 bright lines 5a; 5b; and 5c each the result of combining the contributions of the diffracted light in the zero order, and plus and minus first order as transmitted by the grating from the light source 1.

In which way and how many details are imaged on the area 6 by the object imaging system 13 and 14 depends on what parts of the mirror surface 20 (which at the same time is the focal plane of the lens 13) are silvered. For producing an image of the grating it is only necessary to reflect two coherent, diffracted images, for example the images 5b and 5c, of the light source 1. In this case a false image with twice the line frequency is generated in the area 6.

The further diffraction by the area 6 produces further bright-line foci 7a; 7b; 7c in the plane 18 with the help of the auxiliary imaging system 11a; 11b. The light ray bundles producing these further foci 7a; 7b; 7c are differently inclined to the optical axis of the system by the secondary diffraction of the ±first orders bundles from area 4 at the area 6 of the grating 12. In addition to the foci 7a, 7b, and 7c indicated there are additional foci (not shown) between 7a and 7b and between 7a and 7c for rays diffracted at one but not both of the diffractions, and possibly other foci representing higher orders of diffraction.

All light ray bundles producing the foci 7a; 7b; 7c travel in their further path through an area 8 of the lens 15 which lies adjacent to an area 2 of the lens 10 through which the illuminating light bundle passes. The lenses 15 and 10 which both have optical axes extending in parallel to the optical axis 21 of the system, function as a field separator and separate in the system the returning light from the emitted light.

The lenses 15 and 16 serve to produce again three different images of the light source 1 from the light ray bundles which pass through the area 8 of the lens 15. These images are formed in the plane 17 at locations where photoelectric receivers 9a; 9b; 9c are disposed. Since each one of these light source images is formed by a light ray bundle which has a different inclination when passing through the area 6 of the image plane 19 the light fluxes of the object imaging system 13; 14 are distinguished at the place of the photoelectric receivers also with regard to their direction of extension. That is, sensor 9a is responsive to the zero-order diffracted light, together with $(+1,-1)$ and $(-1,+1)$ diffracted light, focused at 7a, sensor 9b is responsive to light twice diffracted in one direction and focused at 7b.

As clearly shown in FIG. 1 the auxiliary imaging system 11a; 11b images both the mirror surface 20 onto the plane 18 and the object/image plane 19 with its areas 4 and 6 onto the plane 19' with its areas 2 and 8. An unsharp illumination of the object, caused by the illumination aperture, does not occur so that the object area and the image area may be arranged closely side by side. Almost the total light emitted by the light source into the system may be utilized for the signal evaluation. The emitted light rays and the returning light rays travel independently from one another. It is a particular advantage of the invented arrangement that the two conjugated planes 18 and 19' are directly accessible without disturbing the function of the device, as for example touching of the grating scale 12, so that in these planes suitable diaphragms may be arranged which may control the illumination aperture, depth of focus and area of the grating in the imaging system.

In order not to over-complicate the drawing not all of the light ray bundles passing through the area 8 are shown to continue through the lenses 15 and 16 to the light source images in the plane 17. Not shown are further the means by which the photoelectric receivers may be adjusted to the exact plane and position of the light source images since these adjusting means are conventional and a matter of choice by the designer.

Figure 2:
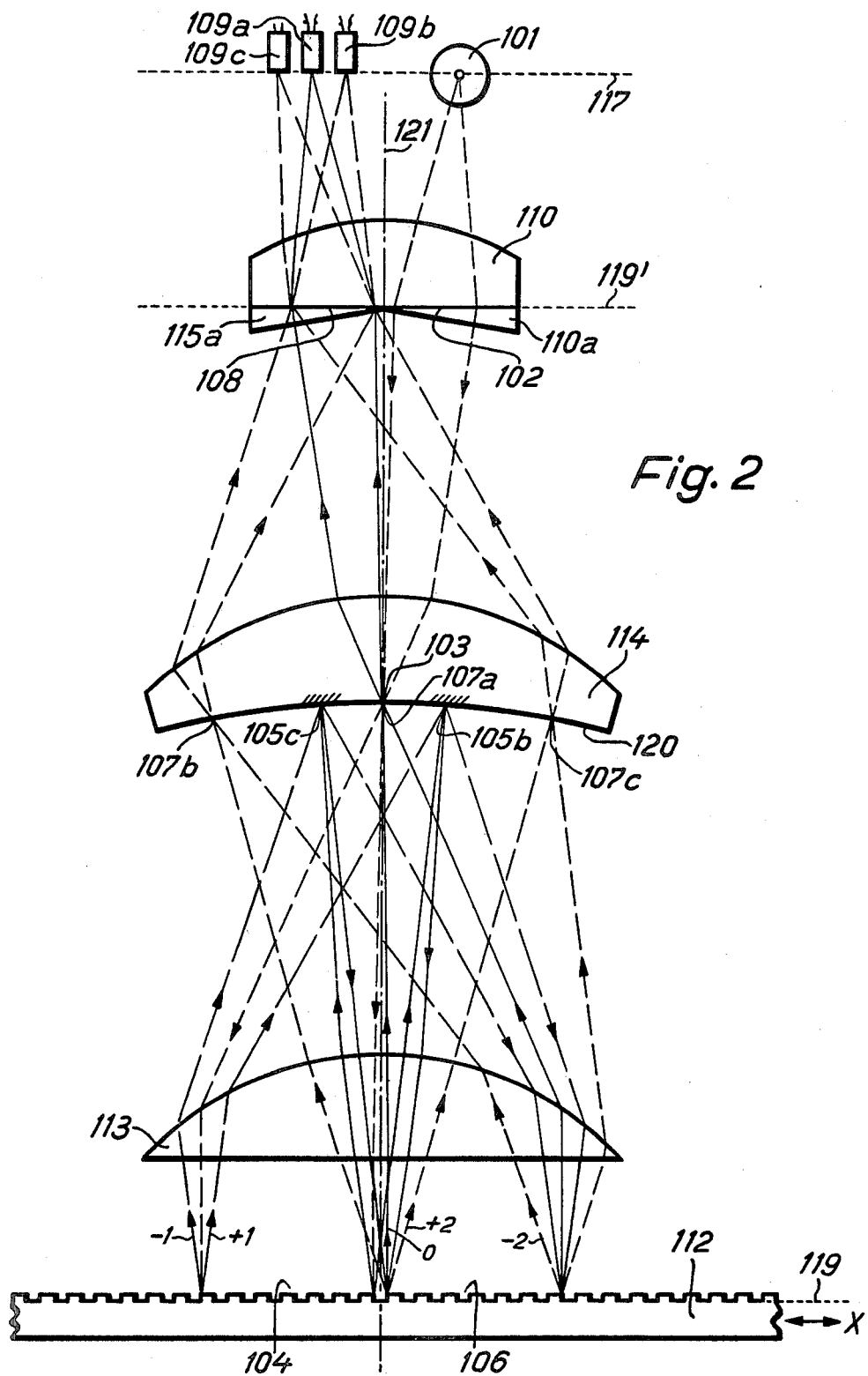
FIG. 2 shows schematically a linear one coordinate photoelectric position transducer comprising an incident light measure scale wherein the object imaging system and the auxiliary imaging system are partially combined.

The embodiment shown in FIG. 2 uses as the object a reflecting laminar phase grating scale 112. Elements having the same function as in the embodiment of FIG. 1 are designated by numerals having the same number as in FIG. 1 in the last two digits. Therefore, mainly the differences compared to the embodiment of FIG. 1 are described hereafter.

By the object imaging system 113; 120 the illuminated object area 104 is imaged on the image area 106 of the plane 119. A phase grating is used as the scale rule 112. This grating is of such a type that the impinging light ray bundle is not reflected in itself but primarily in the direction of the ±first order of diffraction. The center of the vertex of the mirror 120 may therefore remain transparent. The edges of the silvered areas may be used as the illumination aperture. Only the areas 105b and 105c of the mirror 120 are silvered for reflecting the images of the light source which are produced here. These light source images are again multiplied by the second diffraction by the grating area 106. With regard to their direction to the plane 119 of the grating the reflected light ray bundles may be described as the zero order and the ±second order of diffraction. These light ray bundles produce light source images 107a; 107b; 107c in the plane 120 which are imaged onto the plane 117 by means of the refracting power of the lens 114 which functions as the carrier of the concave mirror and also by means of the lens 110. Thus the planes 120 and 117 are conjugated planes relative to one another.

From this description it will be apparent that in this embodiment the carrier 114 of the concave mirror is used as an element of positive refracting power in order to allocate to the grating 112 with its areas 104 and 106 a conjugated plane 119' having the areas 102 and 108. The optical wedges 110a and 115a deflect the light ray bundles passing through the areas 102 and 108 to such an extent that the light source 101 and the photoelectric receivers 109a; 109b; 109c may be arranged in the plane 117; the photoelectric receivers, of course, in the places where the images of the light source are produced.

In the embodiment shown in FIG. 3 and described with reference thereto the elements having the same function as in the embodiments of the FIGS. 1 and 2 are designated by numerals having the same numbers in the last two digits. Due to the modified arrangement the light input and the light output plane of the optical arrangement are separated in this case. For reasons of conformity with the above used expressions both planes are designated by the numeral 217.

Figure 3:
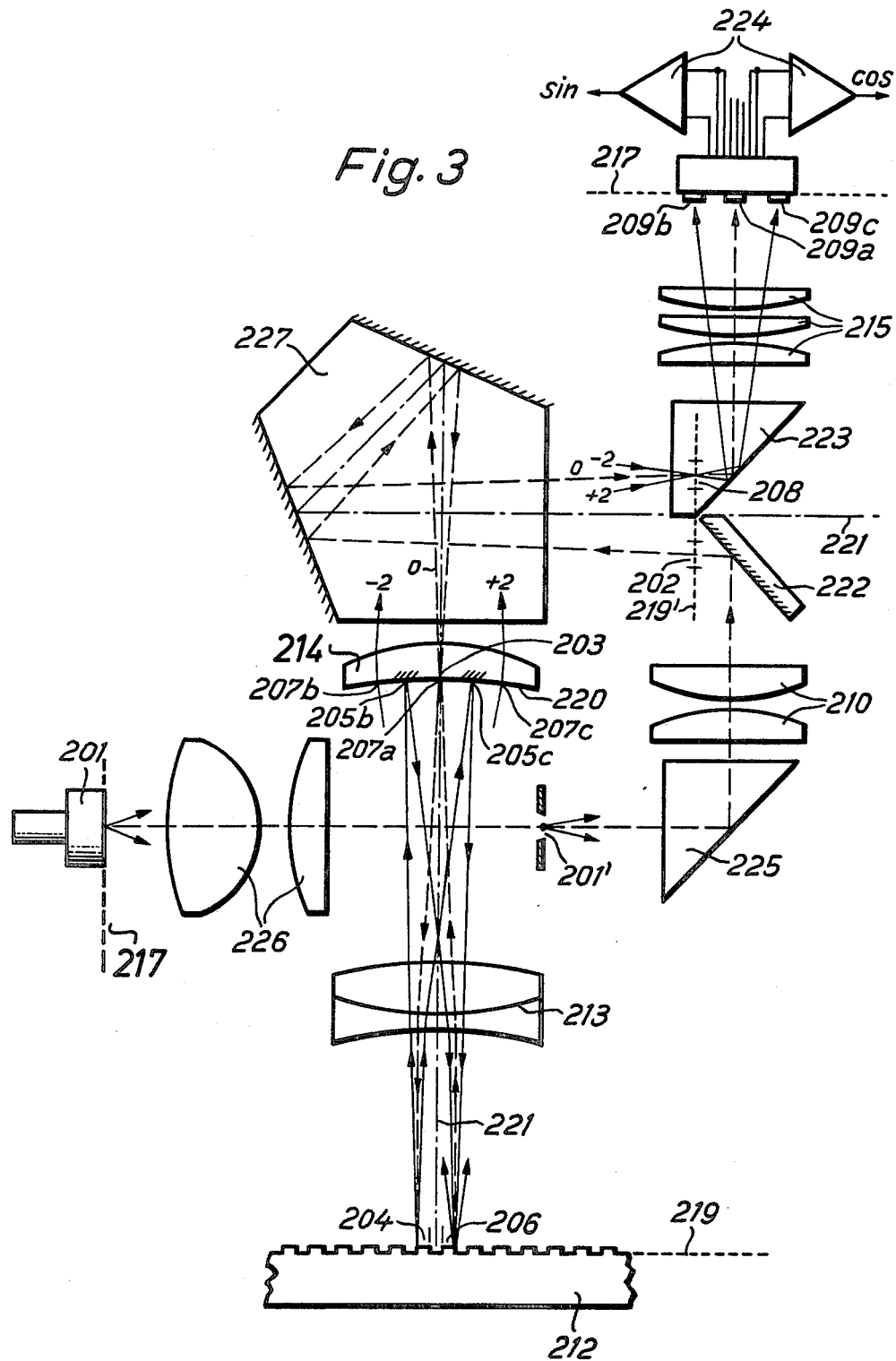
FIG. 3 is a modification of the embodiment of the FIG. 2, e.g. an one dimensional sectional view of a two dimensional transducer comprising a two coordinate checker board grating.

In FIG. 3 it is particularly shown how the embodiment of FIG. 2 may be modified to become less voluminous, however, requiring an increased number of elements. A luminescence diode 201 is enlarged by the optical elements 226 having a positive refracting power. Its light emitting area is clearly defined by a diaphragm and this arrangement is used as a virtual light source 201'. The lenses 210 image this light source on the vertex of the surface 220. The mirror 222 and the reflecting surface of the prism 223 serve as a means for separating the areas 202 and 208 which are conjugated areas to the areas 204 and 206 of the grating plane 219. The prisms 225 and 227 serve merely as a means for shortening the overall-length of the device. For the optical system 214, 215 the conjugated planes are the mirror lens surface 220 and the plane 217 in which the photodiode array 209a; 209b; 209c is disposed which transforms the light into components of an electrical rotary sine and cosine signal. The processing of the signal is of known conventional manner. If grating 212 is a two-dimensional checker board grating the light bundles are diffracted in two coordinates generating at least six separated image areas of the diaphragm 201' covered by the photodiode array.

What is claimed is:

1. Apparatus for measuring the motion of a grating scale of the transmission type in a first plane comprising:
   A. a main imaging system having an optical axis normal to said plane and to said scale which images said scale on itself, in that points on said scale at one side of said axis are imaged at the conjugate points in said plane and on said scale at the other side of said axis, said system defining a second plane complementary to said first plane,
      said main system at one side of said first plane comprising
         a mirror substantially normal to said axis; and
         a refracting element between said mirror and said scale;
   B. an auxiliary imaging system to image the points of said first plane in a third plane conjugated to said first plane and apart from said main system;
   C. a light source;
   D. condensing optics to converge light from said source through said third plane substantially at one side of said axis to be concentrated on a plane complementary to said first plane, said auxiliary system at the other side of said first plane comprising a positive lens of aperture substantially equal to said main system to collimate light upon said grating from a focal point in a plane conjugated to said first plane, said light source and said condensing optics converging the illumination on said focal point;
      (a) whereby said converged light is collimated to illuminate an object region of said scale at one side of said axis;
      (b) whence the light suffers a first diffraction by said grating, into zero, first, second and higher order rays;
      (c) whereby said rays are imaged by said main system onto an image region of said scale, and there undergo a second diffraction into zero, first and higher order rays; and
      (d) whereby said diffracted rays of each of said orders are focused in a plane complementary to said first plane as parallel, spaced-apart, bright lines forming a regular array whereby said first array of line foci and said focal point lie in a plane complementary to said first plane;
   E. a plurality of photosensors, held together in a second array; and F. means for imaging said first array on said second array.

2. The apparatus of claim 1, wherein said last-named means is such that all rays focused between said arrays traverse the same optical elements, thereby maintaining their alignment.

3. The apparatus of claim 1, wherein
   (a) said grating scale is of the reflection type, designed to suppress zero order and enhance first order reflection,
   (b) said main system comprises
   a mirror surface lying in said second plane and
   a positive lens between said mirror and said scale to define said second plane, and
   (c) said auxiliary system comprises
   a refracting element, the first surface of which supports said mirror surface, the central portion of which is transparent to pass light from said source which light is collimated by said positive lens to illuminate said object region, said mirror surface is situated to intercept only the first order diffracted rays from said first diffraction, and said refracting element transmits the zero order and second order diffractions from said first diffraction, and the first-order diffraction from said second diffraction which joins in direction the second and zero order rays of said first diffraction 4. The apparatus of claim 3, wherein the illuminating beam through said central portion, and the rays from said first array to said second array are together bent in a pentaprism of aperture substantially equal to that of said main system.

5. The apparatus of claim 1, in further combination with optical means for separating said third plane to permit wider physical separation of said source and said second array.

* * * * *